US006370278B1

United States Patent
Waguri

(10) Patent No.: US 6,370,278 B1
(45) Date of Patent: Apr. 9, 2002

(54) IMAGE PROCESSING METHOD AND APPARATUS

(75) Inventor: Shinichi Waguri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/233,102

(22) Filed: Jan. 19, 1999

(30) Foreign Application Priority Data

Jan. 16, 1998 (JP) .......................................... 10-020407

(51) Int. Cl.[7] .......................... G06T 5/00; H04N 1/409; H04N 1/56
(52) U.S. Cl. ........................ 382/266; 382/162; 358/529; 358/530; 358/532; 358/447
(58) Field of Search ................................. 382/266, 254, 382/162, 167; 358/530, 532, 500, 529, 447

(56) References Cited

U.S. PATENT DOCUMENTS 4,700,399 A * 10/1987 Yoshida ...................... 382/266
5,392,139 A * 2/1995 Murata ....................... 358/447

FOREIGN PATENT DOCUMENTS

| JP | 63-278469 | 11/1988 |
| JP | 4-351171 | 12/1992 |
| JP | 5-67209 | 3/1993 |
| JP | 5-91223 | 4/1993 |
| JP | 6-6618 | 1/1994 |
| JP | 6-70180 | 3/1994 |
| JP | 8-317241 | 11/1996 |
| JP | 9-9077 | 1/1997 |

* cited by examiner

Primary Examiner—Scott Rogers
(74) Attorney, Agent, or Firm—Sughrue Mion, PLLC

(57) ABSTRACT

A color-to-monochrome image conversion technique is disclosed. After the color image is converted to a monochrome input image and a plurality of primary-color input images, boundary information is extracted from the plurality of primary-color input images. The boundary information discriminates between different colors with the same lightness in the color image. Thereafter, the boundary information is superimposed as a binary image on the monochrome input image to produce the monochrome image. Therefore, a boundary between different colors with the same lightness can be easily imagined and be visibly displayed.

20 Claims, 3 Drawing Sheets

IMAGE PROCESSING METHOD AND APPARATUS

BACKGROUND OF THE INVENTION

1. Field of the Invention

The present invention generally relates to an image processor for use in a facsimile, a copying machine or the like, and in particular to image processing apparatus and method for converting a color image into a monochrome image.

2. Description of the Related Art

In the case of transmitting an original color image to a monochromatic facsimile apparatus such as a Group III facsimile, it is necessary to convert the color image into a black-and-white image based on the lightness of color. Such a black-and-white image is further converted into facsimile data to be transmitted through the public telephone network. Therefore, when a color image having colors of similar lightness (for example, red-color characters on a green-color paper of almost the same lightness) is transmitted, a facsimile apparatus at a sending side reads the colors as the same black-and-white image. Thus, the facsimile apparatus at the receiving side cannot discriminate between the characters and the background, resulting in missing information.

As a method for solving the above problem caused by converting a color image into a monochrome image in facsimile transmission, there has been proposed a facsimile machine in Japanese Patent Application Laid-open Publication No. 6-70180, for example. The conventional facsimile machine converts a color image into a black-and-white image having a plurality of levels of density corresponding to different colors of the color image and then transmits it to the opposite party. Therefore, at the receiving side, it is possible to discriminate between different colors even if the colors are of almost the same lightness.

More specifically, according to the conventional facsimile machine, different half-tone monochrome image levels are assigned to the three principle colors of red, green and blue, and the half-tone monochrome image is transferred by facsimile. According to this system, a full color image read by a scanner is converted into a multi-color image of a plurality of colors by a multi-color converter, and then the multi-color image is converted to a black-and-white image with a plurality of monochrome density levels corresponding to different colors of the multi-color image. In this case, the multi-color image is converted into a black-and-white image of a plurality of black-and-white patterns. Such a black-and-white image is transmitted to the receiving side.

However, the above-described conventional apparatus has the following disadvantages. Although it is possible to transfer the black-and-white image discriminating between different colors of the same lightness, a sender finds it difficult to imagine the monochrome image output produced by the conversion.

Further, since the monochromatic image to be transmitted is composed mainly of a half-tone image, the amount of data increases and the time required for facsimile transmission becomes longer. However, in most cases, senders at a transmitting side already know that a receiver uses a facsimile apparatus for producing a monochromatic output. Therefore, the purpose of transmitting a monochrome image produced from a color image is to transmit a layout of the color image or to transmit only graphical information like a map or character information, and therefore, the image does not necessary require to be an half-tone image.

SUMMARY OF THE INVENTION

An object of the present invention is to provide image processing apparatus and method that are capable of converting a color image into a monochrome image which can discriminate between different colors with the same lightness and further can be easy for an operator to imagine the converted monochrome image.

Another object of the present invention is to provide an image processing apparatus for use in a facsimile machine, that is capable of converting a color image into a black-and-white image which can discriminate between different colors with the same lightness, further can be easy for a sending party to imagine the converted black-and-white image, and furthermore can improve the transmission efficiency.

According to the present invention, the color image is converted to a monochrome input image and a plurality of primary-color input images and then boundary information is extracted from the plurality of primary-color input images. The boundary information discriminates between different colors with the same lightness in the color image. Thereafter, the boundary information is superimposed as a binary image on the monochrome input image to produce the monochrome image. Since the boundary information is extracted and superimposed on the monochrome input image, a boundary between different colors with the same lightness can be easily imagined. In the case of facsimile transmission, such a boundary can be easily imagined by a sending party and can be visible at the receiving party.

The boundary may be extracted by: detecting an edge of each of the primary-color input images to produce edge detection images of the primary-color input images; and combining the edge detection images to produce a combined edge detection image as the boundary information. In this case, the combined edge detection image is superimposed on the monochrome input image to produce the monochrome image where a boundary discriminates between different colors with the same lightness.

The superimposing may be preferably performed by: detecting an edge of the monochrome input image to produce a monochrome edge detection image; extracting the boundary by exclusively combining the combined edge detection image with the monochrome edge detection image; and removing the boundary from the monochrome input image to produce the monochrome image.

In the case of data transmission, it is preferably that the monochrome input image is converted into a binary input image and then the combined edge detection image is removed from the binary input image to produce the monochrome image. Alternatively, it is further preferably that an edge of the monochrome input image is detected to produce a monochrome edge detection image and the monochrome input image is converted into a binary input image. Thereafter, the boundary is extracted by exclusively combining the combined edge detection image with the monochrome edge detection image, and then the boundary is removed from the binary input image to produce the monochrome image.

DETAILED DESCRIPTION OF THE PREFERRED EMBODIMENTS

Figure 1:
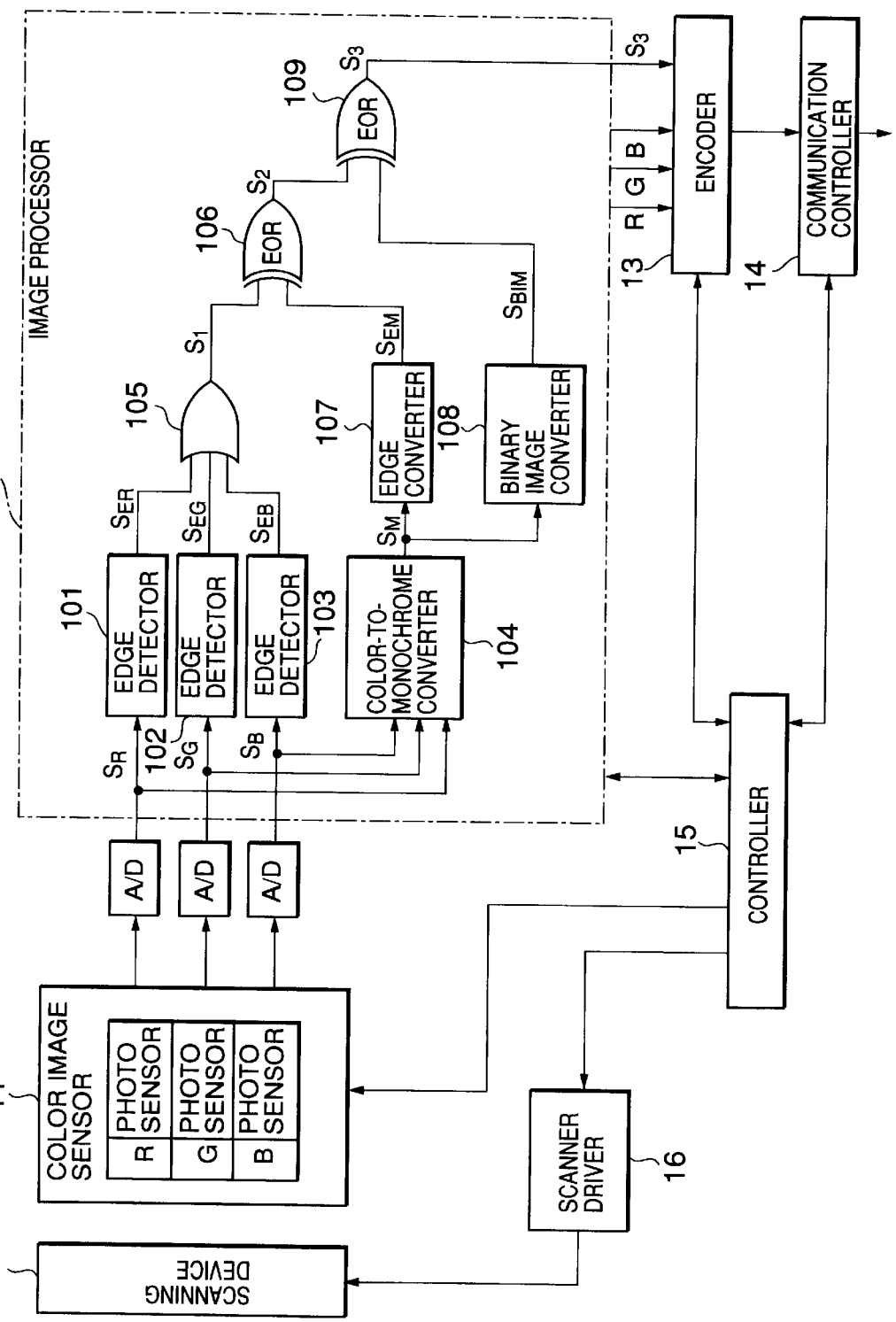
FIG. 1 is a block diagram showing a facsimile machine having an image processor according to an embodiment of the present invention.

Referring to FIG. 1, a facsimile machine is provided with a scanning device 10 that is capable of relatively carrying a color image printed on a recording medium in a main scan direction with respect to an color image sensor 11. The output of the color image sensor 11 is converted from analog to digital by an analog-to-digital converter (A/D) and the digital color image signal is output to an image processor 12. The image processor 12 performs the image conversion from color to black-and-white according to the present invention as described later. The black-and-white image signal produced by the image processor 12 is coded by an encoder 13 and then the coded image signal is transmitted to an opposite party under the control of a communication controller 14.

The operations of the facsimile machine are controlled by a controller 15. The scanning device 10 is driven by a scanner driver 16 under the control of the controller 15. As described later, the line scanning of the color image sensor 11 and the edge detection of the image processor 12 are performed under the control of the controller 15.

The color image sensor 11 is a line sensor or an area sensor extending in the scan line direction, which is designed to optically read the color image on the paper for each scan line perpendicular to the main scan direction. In other words, the color image sensor 11 converts the color image on the paper into electric color (RGB) signals. The color image sensor 11 is composed of an array of pixels each consisting of three photosensors on which RGB (primary colors: Red, Green, and Blue) filters are provided, respectively.

The Red filter filters out Red component from the light reflected on the paper carried by the scanning device 10 and therefore the corresponding sensor produces an electric signal from the Green and Blue components. The Green filter filters out Green component from the reflected light and therefore the corresponding photosensor produces an electric signal from Red and Blue components. The Blue filter filters out Blue component from the reflected light and therefore the corresponding photosensor produces an electric signal from Red and Green components. These signals are converted into digital signals $S_R$, $S_G$ and $S_B$ by the A/D converters, respectively, and the digital signals $S_R$, $S_G$ and $S_B$ are output to the image processor 12.

The image processor 12 performs the conversion of the digital signals $S_R$, $S_G$ and $S_B$ to a black-and-white image signal $S_3$. The image processor 12 is provided with edge detectors 101–103 and a color-to-monochrome converter 104. The respective edge detectors 101–103 receive the digital signals $S_R$, $S_G$ and $S_B$, respectively, and the color-to-monochrome converter 104 receives the digital signals $S_R$, $S_G$ and $S_B$.

Each of the edge detectors 101–103 detects an edge of the corresponding color image on each scan line from the received digital signal. More specifically, the edge is detected by monitoring a change in detected signal level for each pixel on a scan line. For example, when a difference in signal level between adjacent pixels is greater than a predetermined threshold, that position is determined to be an edge on the scan line. In this manner, the respective edge detectors 101–103 produce edge detection signals $S_{ER}$, and $S_{EG}$ and $S_{EB}$, respectively. Further, the color-to-monochrome converter 104 receives the digital signals $S_R$, $S_G$ and $S_B$ from the color image sensor 11 and produces a multi-value monochrome image signal $S_M$.

The edge detection signals $S_{ER}$, $S_{EG}$ and $S_{EB}$ are output to an OR circuit 105, where the logical OR thereof is calculated. The combined edge detection signal $S_1$ is output from the OR circuit 105 to an exclusive-OR circuit 106.

On the other hand, the color-to-monochrome converter 104 outputs the multi-value monochrome image signal $S_M$ to an edge detector 107 and a binary image converter 108. The edge detector 107 detects an edge on the scan line as described above and outputs an edge detection signal $S_{EM}$ to the exclusive-OR circuit 106. The exclusive-OR circuit 106 calculates the logical exclusive-OR of the combined edge detection signal $S_1$ and the edge detection signal $S_{EM}$ to produce a color-boundary detection signal $S_2$.

The binary image converter 108 converts the multi-value monochrome image signal $S_M$ to a binary image signal $S_{BIM}$ and outputs it to an exclusive-OR circuit 109. The binary image converter 108 produces the binary image signal $S_{BIM}$ by comparing the lightness of the multi-value monochrome image signal $S_M$ to a predetermined threshold value.

The exclusive-OR circuit 109 calculates the logical exclusive-OR of the color-boundary detection signal $S_2$ and the binary image signal $S_{BIM}$ to produce the black-and-white image signal $S_3$ that can provide a visible boundary of different color regions as described later.

The black-and-white image signal $S_3$ is compressed to produce facsimile data by the encoder 13 conforming to a predetermined scheme such as ITU-T recommendation.

Next, an operation of the embodiment will be described hereinafter.

Figure 2:
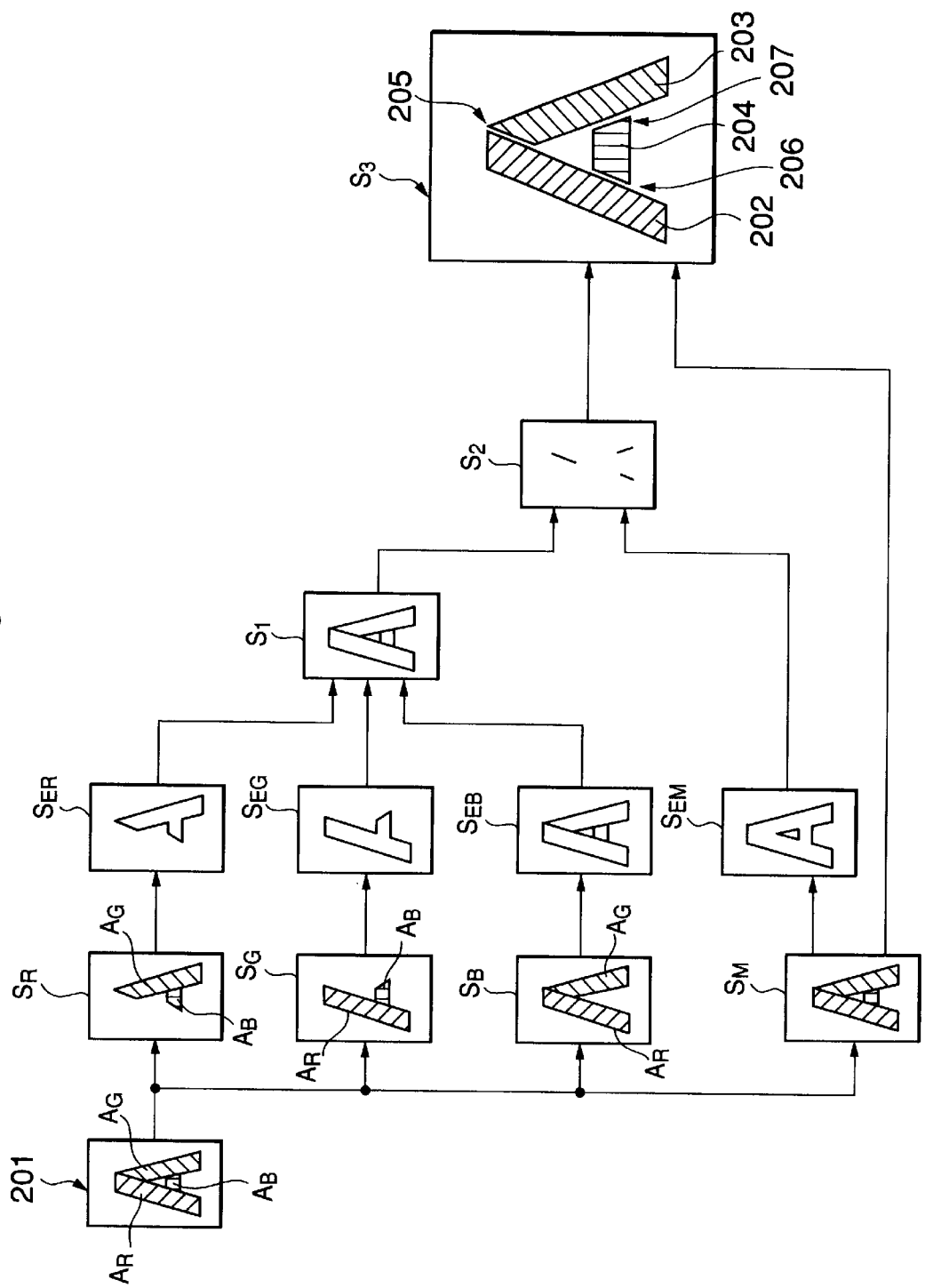
FIG. 2 is a schematic diagram showing an example of an image processing flow for explanation of the operation of the present invention.

Referring to FIG. 2, for simplicity, it is assumed that a color image 201 to be transmitted is a capital letter "A" of alphabet on a white background and that three straight-line segments $A_R$, $A_G$ and $A_B$ for structuring the "A" are red, green and blue, respectively, and the lightness of these colors is at the same level.

When the color image 201 is read by the color image sensor 11, the image processor 12 receives the digital color image signals $S_R$, $S_G$ and $S_B$. As described before, a monochrome image obtained by the color image signal $S_R$ is a multi-value image composed of green- and blue-component segments $A_G$ and $A_B$, a monochrome image obtained by the color image signal $S_G$ is a multi-value image composed of red- and blue-component segments $A_R$ and $A_B$, and a monochrome image obtained by the color image signal $S_B$ is a multi-value image composed of red and green-component segments $A_R$ and $A_G$. Since the lightness of these colors is at the same level, there is no boundary between different color regions in each monochrome image. Similarly, a monochrome image obtained by the multi-value monochrome image signal $S_M$ is composed of the red-, green- and blue-component segments $A_R$, $A_G$ and $A_B$.

The respective edge detectors 101–103 and 107 produce edge detection images indicated by $S_{ER}$, $S_{EG}$, $S_{EB}$ and $S_{EM}$ from the monochrome images indicated by $S_R$, $S_G$, $S_B$ and $S_M$. The edge detection images indicated by $S_{ER}$, $S_{EG}$, $S_{EB}$ and $S_{EM}$ are each produced as block-and-white image. Since the lightness of the colors is at the same level, there is no boundary between different color regions in each edge detection image.

Of these images, the edge detection images indicated by $S_{ER}$, $S_{EG}$, and $S_{EB}$ are combined by the OR circuit 105 to produce a combined edge detection image indicated by $S_1$. This combined edge detection image indicated by $S_1$ includes the boundary lines between different colors as shown in FIG. 2.

Further, the combined edge detection image and the edge detection image indicated by $S_{EM}$ are combined by the exclusive-OR circuit 106. The exclusive-OR circuit 106 extracts unmatched portions between them to produce a color-boundary detection image indicated by $S_2$. In this case, the color-boundary detection image is an image in which only the boundary lines between different colors of the color image 201 are developed.

After the binary image signal $S_{BIM}$ is produced by the binary image converter 108, the exclusive-OR circuit 109 calculates the logical exclusive-OR of the color-boundary detection signal $S_2$ and the binary image signal $S_{BIM}$. Therefore the exclusive-OR circuit 109 removes the boundary lines of the color-boundary detection image indicated by $S_2$ from the binary image indicated by $S_{BIM}$ to produce the final black-and-white image indicated by $S_3$.

Therefore, as shown in the final black-and-white image indicated by $S_3$, the respective straight-line segments 202–204 corresponding to the red-, green- and blue-component segments $A_R$, $A_G$ and $A_B$ are separated from each other through white boundary lines 205–207. As a result, at the receiving side, visible boundary lines of different color regions are displayed in the transmitted facsimile image. Further, at the transmitting side, the user can easily imagine such boundary lines.

Figure 3:
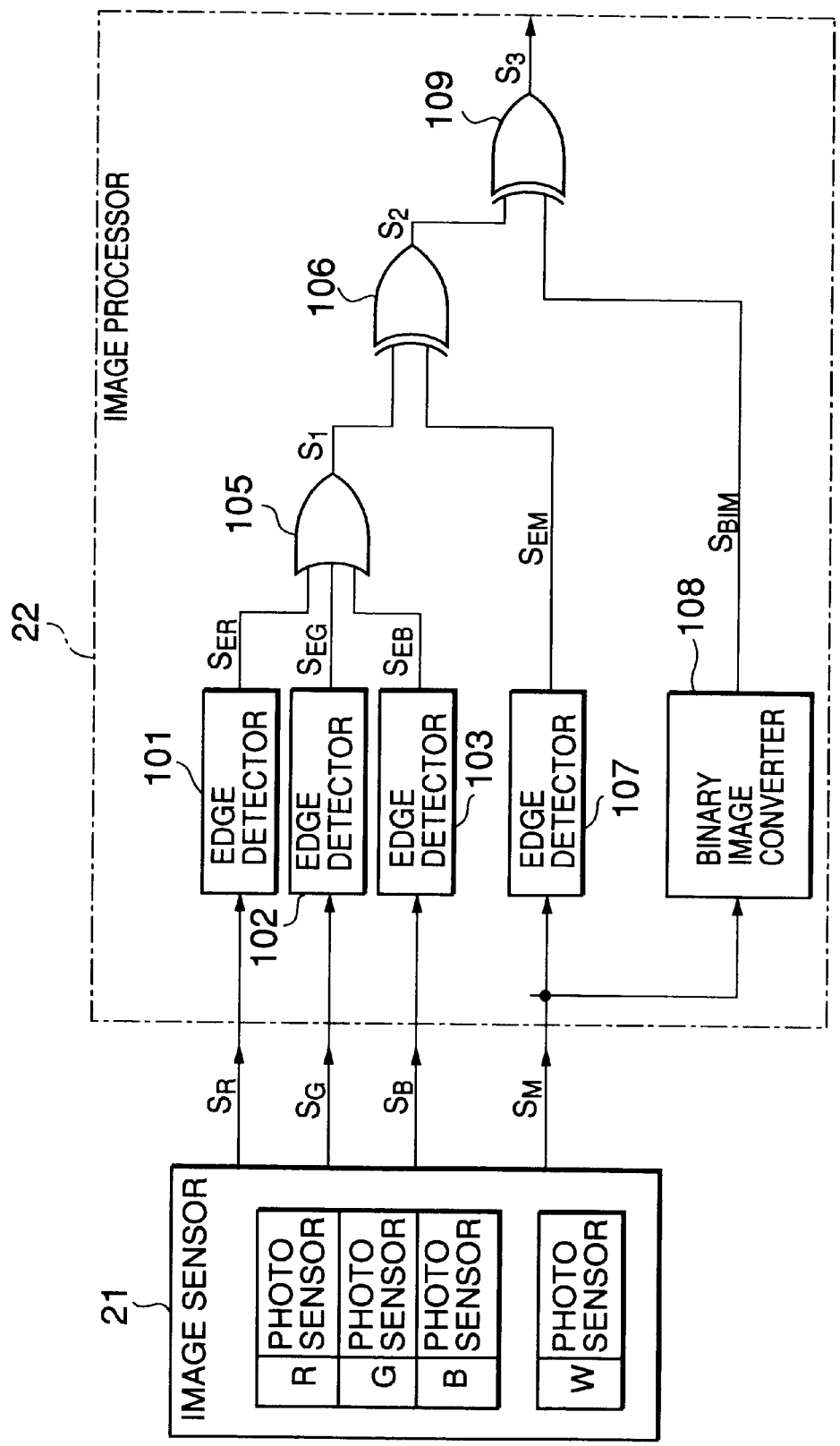
FIG. 3 is a block diagram showing a facsimile machine having an image processor according to another embodiment of the present invention.

Referring to FIG. 3, a facsimile machine according to a second embodiment of the present invention employs an image sensor 21 and an image processor 22. The image sensor 21 is composed of an array of pixels each consisting of the RGB sensors and a monochrome sensor on which a white (W) filter is provided. Therefore, the image processor 22 receives the monochrome signal $S_M$ in addition to the digital signals $S_R$, $S_G$ and $S_B$ from the image sensor 21. In other words, the image processor 22 is in no need of the color-to-monochrome converter 104 as shown in FIG. 1. Since the circuit components other than the color-to-monochrome converter 104 are the same as in the first embodiment of FIG. 1 and the operation thereof is also the same as in the first embodiment, such circuit components are denoted by the same reference numerals and the description of the image processor 22 is omitted.

In the first and second embodiments as shown in FIGS. 1 and 3, it is possible to remove the exclusive-OR circuit 106 and the edge detector 107 from the image processor 12 or 22 and to directly output the combined edge detection signal $S_1$ to the exclusive-OR circuit 109. However, in this case, the final black-and-white image indicated by $S_3$ is obtained such that edge sections other than the color boundary lines may become double lines depending on detection performance of each edge detector. In order to prevent this, extraction of only color boundary lines is carried out by the exclusive-OR circuit 106 and the edge detector 107.

It is clear that a color image having light colors on black background may be used in the present invention. In this case, the color boundary lines are superimposed as black on the final black-and-white image indicated by $S_3$.

The image processor 12 or 22 may be implemented with hardware or software. For example, the logical functions corresponding to blocks 101–109 as shown in FIGS. 1 and 3 can be implemented by a program-controlled processor running the image processing program thereon.

Further, although the above embodiments are explained as the image processing for a facsimile machine, the invention can also be applied to a digital-monochrome copying machine having a color image scanner therein. In this case, the encoder 13 and the communication controller 14 become unnecessary but a printer, for example, a laser printer making use of electrophotography is needed.

As explained above, according to the present invention, the following advantages are obtained. In the case where a color image including different colors in the same lightness is converted into a monochrome image, it is possible to express boundary lines between different colors in the monochrome image such that it is easily imagined by a user. Therefore, when such a monochrome image is transmitted by fax, an opposite party at the receiving side can discriminate between different color regions on the received monochrome image. In other words, information that a sender wants to send can be transmitted without a loss.

Further, since an image is transmitted as a binary or two-value monochrome image with color boundary information superposed thereon, the amount of transmitted information can be smaller as compared with the case where the half-tone image is transmitted, resulting in reduced time required for transmission.

What is claimed is:

1. An image processing method for converting a color image into a monochrome image, comprising the steps of:

a) converting the color image to a monochrome input image and a plurality of primary-color input images;

b) extracting boundary information from the plurality of primary-color input images, wherein the boundary information discriminates between different colors with the same lightness in the color image; and c) superimposing the boundary information as a binary image on the monochrome input image to produce the monochrome image.

2. The image processing method according to claim 1, wherein the step b) comprises the steps of:

b-1) detecting an edge of each of the primary-color input images to produce edge detection images of the primary-color input images; and b-2) combining the edge detection images to produce a combined edge detection image as the boundary information; and the step c) comprises the step of c-1) superimposing the combined edge detection image on the monochrome input image to produce the monochrome image where a boundary discriminates between different colors with the same lightness.

3. The image processing method according to claim 2, wherein the step c-1) comprises the step of removing the combined edge detection image from the monochrome input image to produce the monochrome image.

4. The image processing method according to claim 2, wherein the step c-1) comprises the step of:

detecting an edge of the monochrome input image to produce a monochrome edge detection image;

extracting the boundary by exclusively combining the combined edge detection image with the monochrome edge detection image; and removing the boundary from the monochrome input image to produce the monochrome image.

5. The image processing method according to claim 2, wherein the step c-1) comprises the steps of:

converting the monochrome input image into a binary input image; and removing the combined edge detection image from the binary input image to produce the monochrome image.

6. The image processing method according to claim 2, wherein the step c-1) comprises the step of:

detecting an edge of the monochrome input image to produce a monochrome edge detection image;

converting the monochrome input image into a binary input image;

extracting the boundary by exclusively combining the combined edge detection image with the monochrome edge detection image; and removing the boundary from the binary input image to produce the monochrome image.

7. An image processing apparatus for converting a color image into a monochrome image, comprising:

a first converter for converting the color image to a monochrome input image and a plurality of primary-color input images;

a first extractor for extracting boundary information from the plurality of primary-color input images, wherein the boundary information discriminates between different colors with the same lightness in the color image; and a processor for superimposing the boundary information as a binary image on the monochrome input image to produce the monochrome image.

8. The image processing apparatus according to claim 7, wherein the first extractor comprises:

a first edge detector for detecting an edge of each of the primary-color input images to produce edge detection images of the primary-color input images; and a first combiner for combining the edge detection images to produce a combined edge detection image, wherein the processor superimposes the combined edge detection image on the monochrome input image to produce the monochrome image where a boundary discriminates between different colors with the same lightness.

9. The image processing apparatus according to claim 8, wherein the processor removes the combined edge detection image from the monochrome input image to produce the monochrome image.

10. The image processing apparatus according to claim 8, wherein the processor comprises:

a second edge detector for detecting an edge of the monochrome input image to produce a monochrome edge detection image;

a second extractor for extracting the boundary by exclusively combining the combined edge detection image with the monochrome edge detection image; and an exclusive combiner for removing the boundary from the monochrome input image to produce the monochrome image.

11. The image processing apparatus according to claim 8, wherein the processor comprises:

a second converter for converting the monochrome input image into a binary input image; and an exclusive combiner for removing the combined edge detection image from the binary input image to produce the monochrome image.

12. The image processing apparatus according to claim 8, wherein the processor comprises:

a second edge detector for detecting an edge of the monochrome input image to produce a monochrome edge detection image;

a second converter for converting the monochrome input image into a binary input image;

a second extractor for extracting the boundary by exclusively combining the combined edge detection image with the monochrome edge detection image; and an exclusive combiner for removing the boundary from the binary input image to produce the monochrome image.

13. A facsimile apparatus for transmitting a black-and-white image produced from a color image, comprising:

a first converter for converting the color image to a monochrome input image and a plurality of primary-color input images;

a first extractor for extracting boundary information from the plurality of primary-color input images, wherein the boundary information discriminates between different colors with the same lightness in the color image;

a processor for superimposing the boundary information as a binary image on the monochrome input image to produce the black-and-white image; and a facsimile transmitter for transmitting the black-and-white image to an opposite party.

14. The facsimile apparatus according to claim 13, wherein the first extractor comprises:

a first edge detector for detecting an edge of each of the primary-color input images to produce edge detection images of the primary-color input images; and a first combiner for combining the edge detection images to produce a combined edge detection image, wherein the processor superimposes the combined edge detection image on the monochrome input image to produce the black-and-white image where a boundary discriminates between different colors with the same lightness.

15. The facsimile apparatus according to claim 13, wherein the processor removes the combined edge detection image from the monochrome input image to produce the black-and-white image.

16. The facsimile apparatus according to claim 13, wherein the processor comprises:

a second edge detector for detecting an edge of the monochrome input image to produce a monochrome edge detection image;

a second extractor for extracting the boundary by exclusively combining the combined edge detection image with the monochrome edge detection image; and an exclusive combiner for removing the boundary from the monochrome input image to produce the black-and-white image.

17. The facsimile apparatus according to claim 13, wherein the processor comprises:

a second converter for converting the monochrome input image into a binary input image; and an exclusive combiner for removing the combined edge detection image from the binary input image to produce the black-and-white image.

18. The facsimile apparatus according to claim 13, wherein the processor comprises:

a second edge detector for detecting an edge of the monochrome input image to produce a monochrome edge detection image;

a second converter for converting the monochrome input image into a binary input image;

a second extractor for extracting the boundary by exclusively combining the combined edge detection image with the monochrome edge detection image; and an exclusive combiner for removing the boundary from the binary input image to produce the black-and-white image.

19. A computer-implemented method for converting a color image into a monochrome image, comprising the steps of:

a) converting the color image to a monochrome input image and a plurality of primary-color input images;

b) extracting boundary information from the plurality of primary-color input images, wherein the boundary information discriminates between different colors with the same lightness in the color image; and c) superimposing the boundary information as a binary image on the monochrome input image to produce the monochrome image.

20. The computer-implemented method according to claim 1, wherein the step b) comprises the steps of:

b-1) detecting an edge of each of the primary-color input images to produce edge detection images of the primary-color input images; and b-2) combining the edge detection images to produce a combined edge detection image as the boundary information, wherein in the step c), the combined edge detection image is superimposed on the monochrome input image to produce the monochrome image where a boundary discriminates between different colors with the same lightness.

* * * * *